United States Patent
Djeu

(10) Patent No.: US 7,104,683 B2
(45) Date of Patent: Sep. 12, 2006

(54) THERMALLY COMPENSATED FLUORESCENCE DECAY RATE TEMPERATURE SENSOR AND METHOD OF USE

(75) Inventor: Nicholas Djeu, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 11/161,657

(22) Filed: Aug. 11, 2005

(65) Prior Publication Data

US 2006/0067379 A1 Mar. 30, 2006

Related U.S. Application Data

(60) Provisional application No. 60/522,074, filed on Aug. 11, 2004.

(51) Int. Cl.
*G01K 11/00* (2006.01)
(52) U.S. Cl. ............... 374/161; 374/131; 374/120
(58) Field of Classification Search ............... 374/161, 374/131
See application file for complete search history.

(56) References Cited

U.S. PATENT DOCUMENTS

| 4,075,493 A | 2/1978 | Wickersheim |
| 4,215,275 A | 7/1980 | Wickersheim |
| 4,437,772 A * | 3/1984 | Samulski ............... 374/129 |
| 4,448,547 A | 5/1984 | Wickersheim |
| 4,560,286 A | 12/1985 | Wickersheim |
| 4,652,143 A | 3/1987 | Wickersheim et al. |
| 4,708,494 A * | 11/1987 | Kleinerman ............ 374/161 |
| 4,789,992 A | 12/1988 | Wickersheim et al. |
| 5,112,137 A | 5/1992 | Wickersheim et al. |
| 5,255,980 A * | 10/1993 | Thomas et al. ......... 374/161 |
| 5,968,038 A | 10/1999 | Djeu |
| 6,045,259 A | 4/2000 | Djeu |
| 6,840,669 B1 * | 1/2005 | Kleinerman ............ 374/120 |
| 2002/0186748 A1 | 12/2002 | Yates et al. |

FOREIGN PATENT DOCUMENTS

| EP | 1 265 059 A2 | 11/2002 |
| GB | 2113837 A * | 8/1983 |
| JP | 58137723 A * | 8/1983 |

* cited by examiner

*Primary Examiner*—Diego Gutierrez
*Assistant Examiner*—Mirellys Jagan
(74) *Attorney, Agent, or Firm*—Molly L. Sauter; Smith & Hopen, P.A.

(57) ABSTRACT

The present invention provides a thermally compensated fluorescence decay rate temperature sensor capable of measuring the true temperature of a sample surface and its associated method of use.

13 Claims, 4 Drawing Sheets

THERMALLY COMPENSATED FLUORESCENCE DECAY RATE TEMPERATURE SENSOR AND METHOD OF USE

CROSS REFERENCE TO RELATED APPLICATIONS

This application claims priority to U.S. Provisional Patent Application No. 60/522,074, "Fiber Optice Device with Simultaneous Heating and Temperature Sensing Capabilities", filed Aug. 11, 2004.

BACKGROUND OF INVENTION

Determining the temperature of a solid object is typically accomplished by measuring the temperature of its surface. While it is preferable, for reliability of the measurement, to position a temperature sensor within the object itself so that the sensor is immersed in the material to be measured, this is often not a practical solution.

Contact thermometers, such as thermocouples, thermistors and RTDs (resistance temperature detectors), are often employed to measure the temperature of a surface. Achieving adequate thermal contact between the contact thermometer and the sample surface to be measured can be very difficult. Contact-type temperature sensors suffer from the universal drawback that the very act of contact with the sample drains heat from, or adds heat to, the sample, due to the thermal mass of the sensor relative to the object. Furthermore, in the case of contact with a solid surface, as opposed to immersion in a fluid, true contact is achievable only at a few points and hence the sensor never reaches the exact temperature of the sample surface being measured. As a result, the temperature read by the contact thermometer can deviate substantially from that of the sample.

The problems with contact thermometers are exemplified under low ambient pressure conditions, where conduction by gas in the gap between the sample surface and the thermometer is diminished until it becomes zero in a vacuum. Under these conditions, thermal contact is worsened due to the lack of air molecules present to help conduct heat from the surface to the sensor. Strong radio frequency or microwave fields are also known to negatively affect the ability of these contact thermometers to accurately measure surface temperatures. As such, all contact thermometers which are not incorporated into the surface itself suffer either because good thermal contact is extremely difficult to achieve or because they drain excessive heat from the surface to be measured.

One solution to the contact-type of temperature thermometer is to utilize a thermometer that does not require physical contact with the surface to be measured. One such thermometer known in the art utilizes infrared radiometry. With this approach, thermally-generated infrared radiation from the surface is collected and focused onto an infrared detector. While this is the most common non-contact thermometry technique used in the current state of the art, it is highly unreliable unless the emissive properties of the surface are exceedingly well characterized. Other problems include the need for line of sight access to the surface, poor sensitivity at moderate to low temperatures and the inability to measure transparent materials utilizing infrared radiation.

Accordingly, reliable measurements of surface temperatures have proven to be difficult. Measurement techniques currently known in the art having the highest levels of reliability are typically tedious and time consuming to perform.

What is needed in the art is a surface temperature measurement technique which is both fast and convenient, while at the same time, being reasonably accurate, reliable and adaptable to many environments.

Over the past two decades, the fluorescence-decay rate (FDR) type fiber optic temperature sensor has emerged as an increasingly important class of thermometric devices. The response of these sensors derives from the temperature dependent decay time of some optically induced fluorescence produced by a phosphor which is either attached to one end of the optical fiber or coated on the surface of the object being monitored. FDR sensors are generally recognized as the most accurate optically based systems for temperature measurement in the art. As a result, in spite of their relatively high cost, they are in routine use now in industries as diverse as semiconductor manufacturing, power generation, and metal forming when electromagnetic interference from the environment prevents the use of electrically based sensors or when moving materials are to be interrogated.

However, in view of the prior art considered as a whole at the time the present invention was made, it was not obvious to those of ordinary skill in the pertinent art how the identified need could be fulfilled.

SUMMARY OF INVENTION

The present invention provides a method of determining the surface temperature of a sample. The method includes the steps of positioning a fiberoptic temperature sensor having a phosphor tip at a first distance from a sample surface, heating the sensor tip to a plurality of temperature levels by subjecting the phosphor tip to a plurality of predetermined laser power levels with the tip positioned at the first distance from the sample surface, measuring the temperature of the phosphor tip at each of the plurality of laser power levels with the tip positioned at the first distance from the sample surface, positioning the phosphor tip at a second distance from the sample surface, wherein the second distance is less than the first distance, heating the sensor tip to a plurality of temperature levels by subjecting the phosphor tip to the same plurality of predetermined laser power levels with the tip positioned at the second distance from the sample surface, measuring the temperature of the sensor tip at each of the plurality of laser power levels with the sensor positioned at the second distance from the sample surface, calculating the difference between the detected temperatures at the first distance and the detected temperatures at the second distance for each of the plurality of laser power levels and determining the surface temperature of the sample to be the temperature of the phosphor tip when the difference between the detected temperature at the first distance and the detected temperature at the second distance is substantially equal to zero.

In a specific non-contact embodiment of the method in accordance with the present invention, the first distance is equal to about 1 mm and the second distance is equal to about 10–100 µm. Alternatively, when employed in a contact mode, the second distance is substantially equal to zero, such that the sensor tip is in contact with the sample surface.

In accordance with the present invention, heating of the sensor tip to a plurality of temperature levels is accomplished by subjecting the phosphor tip to the plurality of predetermined laser power levels, wherein the predetermined laser power levels are selected such that the sensor tip is heated as a result of optical power dissipation in the phosphor tip. Accordingly, self-heating of the tip is accomplished through the application of the heating laser to the phosphor tip.

Measuring the temperature of the sensor tip at each of the plurality of laser power levels further includes, exciting the fiberoptic temperature sensor phosphor tip at a predetermined laser power level to cause the phosphor to emit a fluorescence, monitoring the emitted fluorescence to detect a phase shift or the decay time in the fluorescence, correlating the phase shift or the decay time in the fluorescence of the phosphor to the temperature at the fiberoptic temperature sensor phosphor tip.

In accordance with a particular embodiment, identifying the temperature of the sample surface includes, plotting the calculated difference between the sensor tip temperature at the first distance and the sensor tip temperature at the second distance against the temperature of the sensor tip at the first distance for each of the plurality of laser power levels, constructing a substantially smooth line connecting the differences plotted and identifying the temperature of the sample surface as the temperature of the sensor tip at the first distance where the line connecting the differences plotted crosses from positive to negative.

In an additional embodiment for use in monitoring a time varying temperature of a sample, the plurality of laser power levels for heating the phosphor tip may be selected to follow a predetermined profile for the sample surface temperature.

A system for measuring a sample surface temperature in accordance with the present invention includes a fluorescence decay rate temperature sensor comprising an optical fiber, a phosphor tip and an excitation laser, a heating laser positioned to provide a plurality of predetermined heating laser power levels to the phosphor tip through the optical fiber to cause the phosphor tip to heat to a plurality of temperature levels, a detector in communication through the optical fiber to monitor the fluorescence emitted by the phosphor tip and detect a phase shift or the decay time in the fluorescence and a signal processor to correlate the phase shift or the decay time in the fluorescence of the phosphor to the temperature level at the fiberoptic temperature sensor phosphor tip. A data processor may then be used to analyze the plurality of temperature levels detected at the phosphor tip to identify the interpolated temperature of a sample surface.

In a specific embodiment of the system in accordance with the present invention, either manual or mechanical means may be used for positioning the phosphor tip at a first distance from the sample surface and at a second distance from the sample surface, wherein the first distance is greater than the second distance. Either electronic or manual means for calculating the difference between a detected temperature of the phosphor tip at the first distance and the detected temperature of the phosphor tip at the second distance for each of the plurality of laser power levels employed and either electronic or manual means are used for determining the surface temperature of the sample as being equal to the temperature of the phosphor tip when the difference between the detected temperature at the first distance and the detected temperature at the second distance is substantially equal to zero. As such, when the self-heated phosphor tip is moved from a position farther from the sample to a position very close to the sample, the detected temperature of the phosphor tip does not change.

While all FDR temperature sensors are within the scope of the present invention, in a particular embodiment, the fluorescent decay rate temperature sensor is an all-crystalline fluorescent decay rate temperature sensor in which the phosphor tip is fused directly onto a crystalline lead fiber.

In a specific embodiment, the heating laser and the excitation laser are separate lasers and the heating laser is positioned to have orthogonal polarization relative to the excitation laser. Yet, in an additional embodiment, the heating laser and the excitation laser are the same laser which has a small pulsed output superposed on top of a large baseline.

In the case of a time varying temperature monitoring system, the system in accordance with the present invention further includes a profile program module to program the heating laser to follow a predetermined temperature profile when heating the phosphor tip to a plurality of temperature levels.

The system in accordance with the present invention may additionally include a feedback mechanism to allow adjustment of the heating laser based on temperature feedback received from the phosphor tip temperature measurement.

The use of fluorescence decay rate temperature sensors is known in the art. The difficulty of surface temperature sensing utilizing fluorescence decay rate temperature probes stems from two primary sources. First, the actual area of contact is generally a small fraction of the apparent contact area because of surface roughness, creating in effect a thin layer of high thermal resistance between the sample and the temperature probe which in turn causes a temperature differential between the sample and the probe. Additionally, the presence of the probe itself may cause a sufficiently large thermal perturbation sufficient to alter the temperature of the sample at the point of contact. The thermally compensated fluorescence decay rate temperature sensor system and method in accordance with the present invention overcomes these known difficulties.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In accordance with the present invention is provided a thermally compensated fluorescence decay rate temperature sensor that is capable of measuring the true temperature of a sample surface. In a particular embodiment, the phosphor tip of an FDR sensor is heated utilizing a laser source that causes the phosphor tip to heat up owing to the nonradiative processes experienced by the fluorescent state. The temperature of the tip is dependent upon the optical power dissipated at the tip. After the phosphor tip is heated to a predetermined temperature, the phosphor is excited via the optical fiber by a low power source inside the instrument, and the resulting luminescence travels back to a detector. The source and detector, along with signal-processing electronics and control functions are positioned at the near end of the probe and in communication with additional circuitry as required through a fiber-optic connector.

In accordance with an embodiment of the present invention, the output from a laser used to heat the phosphor tip is combined with the output from the pulsed excitation laser of the FDR sensor to establish a thermally compensated fluorescence decay rate temperature sensor. FDR temperature sensors lend themselves particularly well to this purpose, since the phosphor, which serves as the active sensing element can readily be heated by either the same excitation laser or a separate laser.

Figure 1:
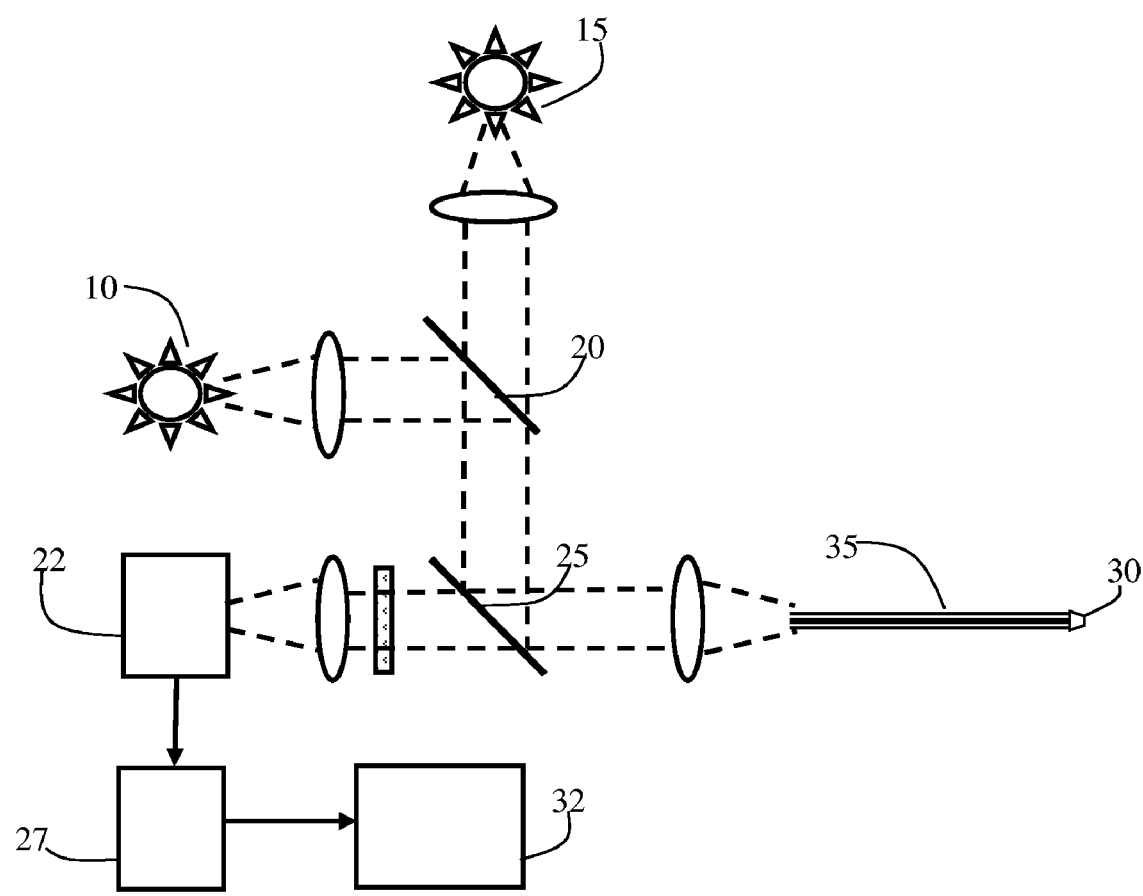
FIG. 1 is a diagrammatic view of the thermally compensated fluorescence decay rate temperature sensor system in accordance with the present invention.

With reference to FIG. 1, in a particular embodiment, the thermally compensated fluorescence decay rate temperature sensor in accordance with the present invention includes an excitation laser 10 operating at wavelength $\lambda_1$, and a heating laser 15 operating at $\lambda_2$. It is noted that $\lambda_1$ and $\lambda_2$ may be the same wavelength. With this embodiment fluorescence from the phosphor 30 of the fluorescence decay rate temperature sensor 35 is centered at $\lambda_3$. The beam combiner 20 combines $\lambda_1$ and $\lambda_2$, while the beam splitter 25 preferentially rejects $\lambda_1$ and $\lambda_2$, but passes $\lambda_3$. It is within the scope of the invention to use the excitation laser as the heating laser, therefore an additional laser specific for heating of the phosphor may not always be required.

In a specific embodiment of the invention, with the thermally compensated FDR sensor positioned in the vicinity of the sample, but not in contact with the surface, the heating laser 15 will be set at a power level to give a tip temperature in the neighborhood of the sample's temperature, $T_S$. Upon contact with the sample surface, the probe tip 30 will read a temperature either higher or lower than the pre-heated tip temperature, which will be closer to the actual temperature of the surface. For those temperatures initially below the sample's temperature, a rise will be observed when the tip touches the sample, and for those temperatures above the sample's temperatures, a drop will be noted. The heating laser is then instructed to supply a different power level and the procedure is reiterated until the thermally compensated probe temperature is the same before and after contacting the sample, thereby yielding the true sample surface temperature, $T_S$. It is within the scope of the present invention to automate this iterative process. The detector 22 is used to detect the fluorescence from the phosphor tip for the temperature measurement at the tip. The amplifier 27 and the signal processor 32 are then used to analyze the differential temperatures to determine the true sample surface temperature.

While all FDR temperature sensors are within the scope of the invention a particular embodiment utilizes an all-crystalline construction due to its high temperature capability.

Figure 2:
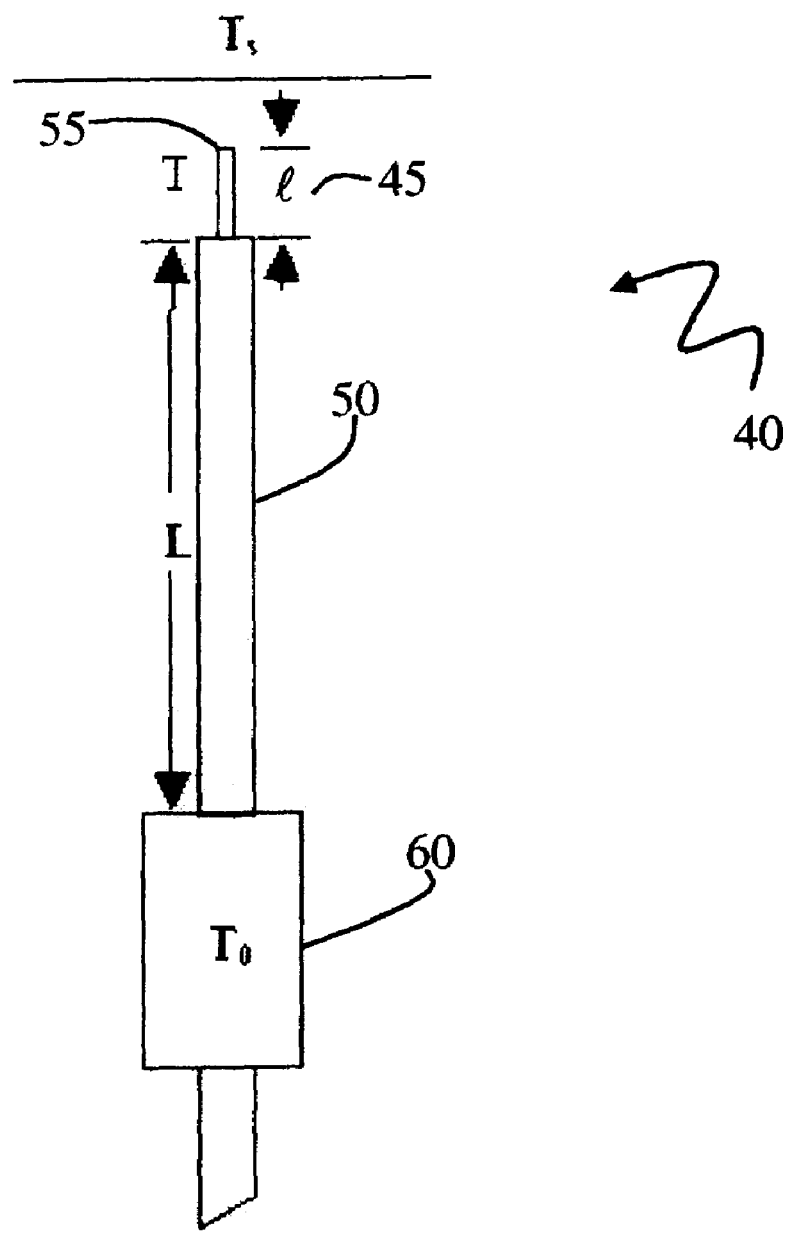
FIG. 2 is a diagrammatic view illustrating the operating principle of a thermally compensated fiber-optic FDR temperature sensor in accordance with the present invention.

With reference to FIG. 2, a thermally compensated FDR sensor in accordance with the present invention is illustrated. As is shown, the fluorescence decay temperature sensor 40 includes a probe section 45 extending from an optical fiber and protected by a ceramic tube 50 for its entire length except for a short length near the platinum coated phosphor tip 55. At a prescribed distance from the exposed tip, the ceramic tube 50 is secured to a heat sink 60, kept at ambient temperature. In a specific embodiment, the exposed tip of the probe 45 is assumed to have a uniform temperature T and to undergo heat exchange with the sample at temperature $T_s$ and the heat sink at temperature $T_o$ by conduction only, through the surrounding gas and the probe/ceramic tube respectively. Thermal transport between the tip and the sample is treated separately for the end and the sidewall.

For the end, the conductive medium is assumed to be in the shape of an inverted frustrum with areas $\pi a^2$ at the bottom and $\pi(a+d)^2$ at the top, where a is the radius of the probe and d is the distance between the probe and the sample. Then the rate of heat transfer between the end and the sample is $\pi Ka(1+a/d)(T_s-T)$, where K is the thermal conductivity of the gas in between.

The rate of heat transfer between the sidewall and the sample is taken to be $\pi K\sqrt{al}(T_s-T)$, where l is the length of the exposed tip. Then the temperature of the tip is found to be:

$$T = \frac{P' + T_0 + (\kappa L/\kappa' a'^2)[\sqrt{al} + a(1 + a/d)]T_S}{1 + (\kappa L/\kappa' a'^2)[\sqrt{al} + a(1 + a/d)]}$$

with $$P' = \frac{L}{\pi \kappa' a'^2} P$$

and where L is the length of the ceramic tube, a' is its radius, and k' its thermal conductivity. P is the laser power dissipated in the phosphor, i.e. the absorbed power multiplied by the fraction of decay rate which is nonradiative in origin. As such, these equations provide a good approximation for d less than or comparable to 2a for negligible radiative transfer.

Figure 3:
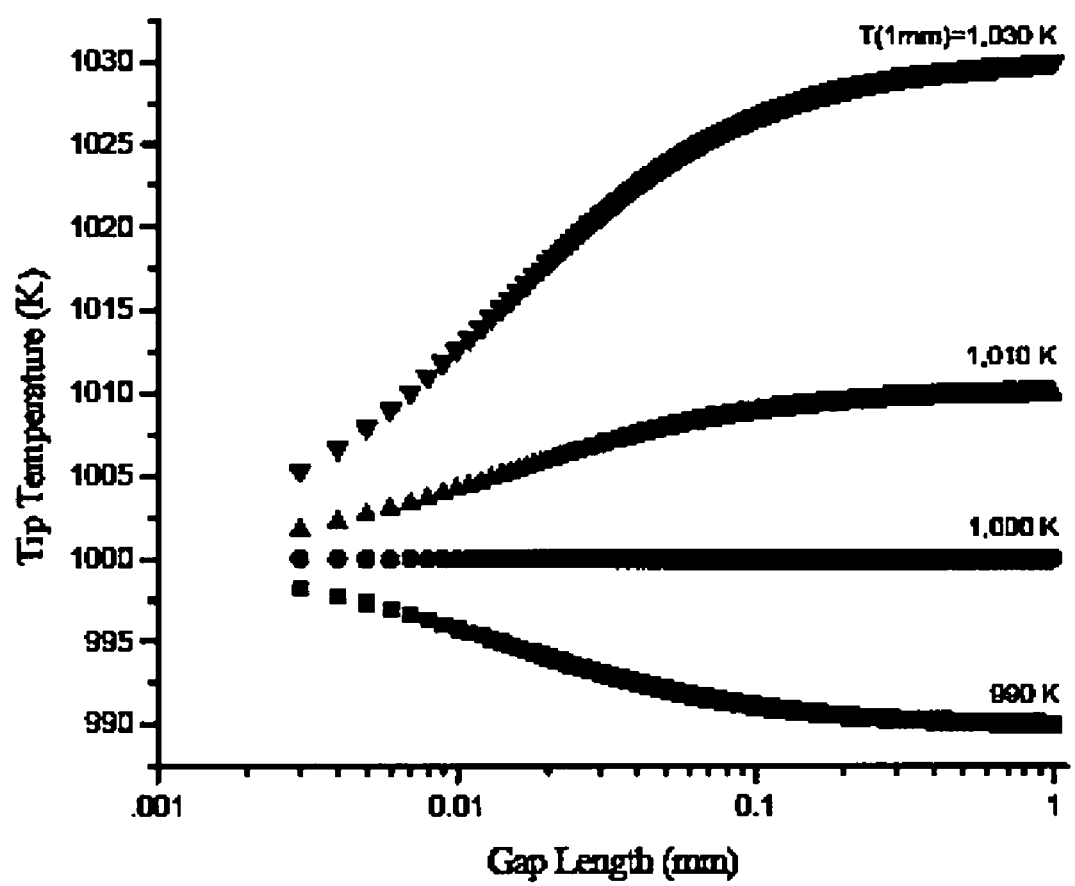
FIG. 3 is a graphical illustration of tip temperature vs. gap length at a plurality of heating laser power levels.

With reference to FIG. 2, the dependence of the tip's temperature on its distance from the sample has been calculated utilizing the above equations for several initial values of heating laser power 1 mm away from the sample. For these calculations, it is assumed that $T_S$=1000K, $T_0$=300K, L=100 mm, l=2 mm, a=0.25 mm, a'=0.75 mm, k=0.063 W/mk (for air at 1,000K), and k'=22 W/mK (for alumina at 650K). To obtain the curves as shown in FIG. 3, P' was first calculated for some selected value of T at d=1 mm. Then for each P', the above equation yields one of the curves shown in FIG. 3. In real situations, the minimum gap will be determined by the roughness of the sample surface. The effect of contact will be to cause a jump in the tip temperature to a value closer to that of the sample. The exact magnitude of the jump will depend on the contact conductance through such factors as the cleanliness of the sample's surface, its roughness, the sample's thermal conductivity, its hardness and the contact pressure.

Figure 4:
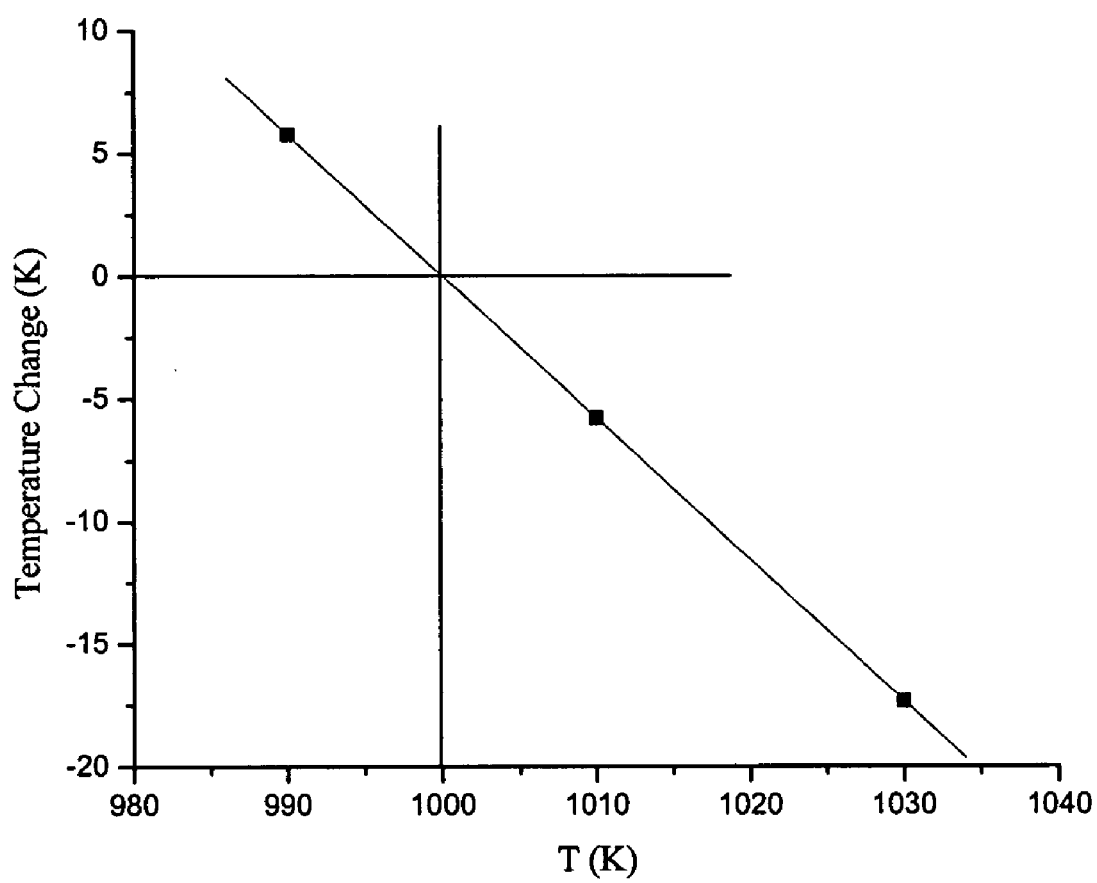
FIG. 4 is a graphical illustration plotting the difference between the tip temperature at a first distance and the tip temperature at a second distance relative to the tip temperature at the first distance, to determine the true surface temperature.

By way of illustrating the procedure for obtaining the true surface temperature, the differences in simulated temperatures at 1 mm and 0.01 mm from the surface for the 990K, 1010K and 1030K cases as shown in FIG. 3 are plotted against the temperature at 1 mm from the surface as shown in FIG. 4. A best straight line fit is them made through the three plotted points. The correct surface temperature is inferred from the intersection of the straight line with the horizontal axis 65 to be 1000K as indicated at 70.

In many situations, it is the temporal evolution of a sample's temperature that needs to be determined. An example in the manufacturing context is the rapid thermal processing of electronic materials. There is a need for improved temperature sensing in rapid thermal processing. Contact thermometers are not well suited for rapid thermal processing. Since the wafers are typically very thin, a contact sensor would produce localized cooling by draining heat from the surface. An additional concern with contact sensors is the possibility of contamination of the wafer and/or the RTP chamber by the contact probe. The thermally compensated FDR sensor in accordance with the present invention overcomes these problems. When the thermally compensated FDR sensor in accordance with the present invention is operated in the non-contact mode and the probe is fabricated of a monolithic crystalline structure to insure that it is as clean as the wafer itself, these deficiencies in the prior art are overcome. Additionally, contamination of the wafer through contact can be avoided by providing a silicon overcoat on top of the reflective coating of the tip.

In an additional embodiment of the present invention, the thermally compensated FDR sensor is used to monitor the time varying temperature such as in a rapid thermal processing environment. In this RTP environment, one wants to ensure that the temporal evolution of the sample's temperature follow a prescribed profile. The heating laser of the thermally compensated FDR sensor in accordance with the present invention can be programmed to produce the desired profile in the phosphor tip first in the vicinity of the sample. The, any deviation from the profile will manifest itself as an altered profile upon closing the gap to or contacting the sample.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described.

What is claimed is:

1. A method of determining the surface temperature of a sample, the method comprising the steps of:
    positioning a fiberoptic temperature sensor having a phosphor tip at a first distance from a sample surface;
    heating the sensor tip to a plurality of temperature levels by subjecting the phosphor tip to a plurality of predetermined laser power levels with the tip positioned at the first distance from the sample surface;
    measuring the temperature of the phosphor tip at each of the plurality of laser power levels with the tip positioned at the first distance from the sample surface;
    positioning the phosphor tip at a second distance from the sample surface;
    heating the sensor tip to a plurality of temperature levels by subjecting the phosphor tip to the same plurality of predetermined laser power levels with the tip positioned at the second distance from the sample surface;
    measuring the temperature of the sensor tip at each of the plurality of laser power levels with the sensor positioned at the second distance from the sample surface;
    calculating the difference between the detected temperatures at the first distance and the detected temperatures at the second distance for each of the plurality of laser power levels; and
    determining the surface temperature of the sample to be the temperature of the phosphor tip when the difference between the detected temperature at the first distance and the detected temperature at the second distance is substantially equal to zero.

2. The method of claim 1, wherein the first distance is at least about 1 mm.

3. The method of claim 1, wherein the second distance is between about 10 µm and about 100 µm.

4. The method of claim 1, wherein the second distance is substantially equal to zero, such that the sensor tip is in contact with the sample surface.

5. The method of claim 1, wherein the step of heating the sensor tip to a plurality of temperature levels by subjecting the phosphor tip to the plurality of predetermined laser power levels further comprises, selecting the predetermined laser power levels such that the sensor tip is heated as a result of optical power dissipation in the phosphor tip.

6. The method of claim 1, wherein the step of calculating the difference between the detected temperatures further comprises interpolating between the detected temperatures at the first distance and the detected temperatures at the second distance and calculating the difference between the interpolated temperatures at the first distance and the interpolated temperatures at the second distance.

7. The method of claim 1, further comprising the steps of:
    plotting the calculated difference between the sensor tip temperature at the first distance and the sensor tip temperature at the second distance against the temperature of the sensor tip at the first distance for each of the plurality of laser power levels;
    constructing a substantially smooth line connecting the differences plotted; and
    identifying the temperature of the sample surface as the temperature of the sensor tip at the first distance where the line connecting the differences plotted crosses from positive to negative.

8. The method of claim 1, wherein the plurality of laser power levels for heating the phosphor tip are selected to follow a predetermined temporal profile for the sample surface temperature.

9. The method of claim 1, wherein the second distance is less than the first distance.

10. The method of claim 1, wherein the step of measuring the temperature of the sensor tip at each of the plurality of laser power levels further comprises the steps of:
    exciting the fiberoptic temperature sensor phosphor tip at a predetermined laser power level to cause the phosphor to emit a fluorescence;
    monitoring the emitted fluorescence to detect a phase shift in the fluorescence; and
    correlating the phase shift in the fluorescence of the phosphor to the temperature at the fiberoptic temperature sensor phosphor tip.

11. The method of claim 10, wherein the step of exciting the fiberoptic temperature sensor phosphor tip at a predetermined laser power level to cause the phosphor to emit a fluorescence further comprises, subjecting the fiberoptic temperature sensor tip to a modulated optical source.

12. The method of claim 1, wherein the step of measuring the temperature of the sensor tip at each of the plurality of laser power levels further comprises the steps of:
    exciting the fiberoptic temperature sensor phosphor tip at a predetermined laser power level to cause the phosphor to emit a fluorescence;
    monitoring the emitted fluorescence to detect a decay time in the fluorescence; and correlating the decay time in the fluorescence of the phosphor to the temperature at the fiberoptic temperature sensor phosphor tip.

13. The method of claim 12, wherein the step of exciting the fiberoptic temperature sensor phosphor tip at a predetermined laser power level to cause the phosphor to emit a fluorescence further comprises, subjecting the fiberoptic temperature sensor tip to a train of optical pulses.

* * * * *